(12) United States Patent
Eikermann et al.

(10) Patent No.: US 12,391,072 B2
(45) Date of Patent: Aug. 19, 2025

(54) PNEUMATIC TIRE FOR A VEHICLE

(71) Applicant: Continental Reifen Deutschland GmbH, Hannover (DE)

(72) Inventors: Wilke Eikermann, Hannover (DE); Florian Kristen, Burgwedel (DE); Frank Steinlüke, Wunstorf (DE); Alexander Wüst, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 47 days.

(21) Appl. No.: 18/568,138

(22) PCT Filed: Dec. 17, 2021

(86) PCT No.: PCT/DE2021/200266
§ 371 (c)(1),
(2) Date: Dec. 7, 2023

(87) PCT Pub. No.: WO2022/258089
PCT Pub. Date: Dec. 15, 2022

(65) Prior Publication Data
US 2024/0270024 A1 Aug. 15, 2024

(30) Foreign Application Priority Data
Jun. 8, 2021 (DE) .................... 10 2021 205 792.6

(51) Int. Cl.
*B60C 11/12* (2006.01)
*B60C 11/03* (2006.01)
*B60C 11/13* (2006.01)

(52) U.S. Cl.
CPC ...... *B60C 11/0323* (2013.01); *B60C 11/1281* (2013.01); *B60C 2011/0353* (2013.01); *B60C 2011/0388* (2013.01)

(58) Field of Classification Search
CPC ............ B60C 11/0323; B60C 11/1263; B60C 11/1281
See application file for complete search history.

(56) References Cited

U.S. PATENT DOCUMENTS

| | | | |
|---|---|---|---|
| 2011/0168311 A1 | 7/2011 | Voss | |
| 2017/0174008 A1* | 6/2017 | Marlier | ................. B60C 1/0016 |

(Continued)

FOREIGN PATENT DOCUMENTS

| | | |
|---|---|---|
| DE | 102010017702 A1 | 1/2012 |
| DE | 102013107161 A1 | 1/2015 |

(Continued)

OTHER PUBLICATIONS

Machine translation: DE-102020204226-A1, Dettmer F, (Year: 2025).*

(Continued)

*Primary Examiner* — Kendra Ly
(74) *Attorney, Agent, or Firm* — Richard A. Wolf; Gregory Adams

(57) ABSTRACT

A pneumatic tire for a vehicle with a tread having at least one profile rib, which is delimited on at least one side thereof by a circumferential groove. The circumferential groove has, when viewed in cross section, a portion running in the radial direction and having a width of up to 3.0 mm and, adjoining it, a radially inner channel region. The radially inner channel region is delimited by two channel walls and a channel base forming the groove base, and has a larger cross-sectional area and is made wider in each case than the portion running in the radial direction. The profile rib is provided over its circumference with sipes, which merge into the circumferential groove, run at an angle of 0° to 50° with respect to the axial direction and have a width of 0.4 mm to 1.2 mm and a maximum depth of 70% to 100% of the profile depth, and have sipe walls. Each sipe is locally widened by at least one channel which is open to the tread periphery and merges into (Continued)

Detail Z₂

Section III-III the radially inner channel region of the circumferential groove. The channel is formed by a depression formed in one sipe wall and a depression formed on the other sipe wall, opposite the first depression.

19 Claims, 3 Drawing Sheets

(56) References Cited

U.S. PATENT DOCUMENTS

| | | | |
|---|---|---|---|
| 2018/0244111 A1* | 8/2018 | Zhu | B60C 11/0306 |
| 2018/0345733 A1* | 12/2018 | Ooba | B60C 11/1218 |
| 2020/0070586 A1 | 3/2020 | Ocana Amezcua et al. | |
| 2022/0055413 A1 | 2/2022 | Domprobst | |

FOREIGN PATENT DOCUMENTS

| | | | | |
|---|---|---|---|---|
| DE | 102017208010 A1 | 11/2018 | | |
| DE | 102018208349 A1 | 11/2019 | | |
| DE | 102018217712 A1 | 4/2020 | | |
| DE | 102020204226 A1 * | 10/2021 | | B60C 11/0323 |
| EP | 2644408 A1 | 10/2013 | | |
| EP | 2463121 B1 | 6/2016 | | |
| EP | 3152067 B1 | 10/2018 | | |
| EP | 3521064 A1 | 8/2019 | | |
| JP | 02310108 A * | 12/1990 | | B60C 11/0323 |
| JP | H02310108 A | 12/1990 | | |
| JP | H031910 A | 1/1991 | | |
| JP | 2006168462 A | 6/2006 | | |
| WO | 2020128271 A1 | 6/2020 | | |

OTHER PUBLICATIONS

Machine translation: JP-02310108-A, Nakamura H, (Year: 2025).*
The International Search Report and the Written Opinion of the International Searching Authority mailed on Mar. 14, 2022 for the PCT Application No. PCT/DE2021/200266 which this application claims priority.

* cited by examiner

Fig. 1

Fig. 2: Detail $Z_2$

Fig. 3 : Section III-III

Fig. 4 : Detail $Z_4$

PNEUMATIC TIRE FOR A VEHICLE

CROSS-REFERENCE TO RELATED APPLICATIONS

The present application is a National Stage Application under 35 U.S.C. § 371 of International Patent Application No. PCT/DE2021/200266 filed on Dec. 17, 2021, and claims priority from German Patent Application No. 10 2021 205 792.6 filed on Jun. 8, 2021, in the German Patent and Trademark Office, the disclosures of which are herein incorporated by reference in their entireties.

TECHNICAL FIELD

The invention relates to a pneumatic tire for a vehicle, in particular a utility vehicle tire, with a tread having at least one profile rib, which is delimited on at least one side thereof by a circumferential groove, wherein the circumferential groove has, when viewed in cross section, a portion running in the radial direction and having a width of up to 3.0 mm and, adjoining it, a radially inner channel region, wherein the radially inner channel region is delimited by two channel walls and a channel base forming the groove base, and has a larger cross-sectional area and is made wider in each case than the portion running in the radial direction.

BACKGROUND

Circumferential grooves with sipe-like narrow portions running in the radial direction and channel regions located in the interior of the tread, having the groove base and configured to be substantially wider than the narrow portion are advantageous for a low rolling resistance of the tire, especially in the central or middle tread region. When the tire rolls on the underlying surface, the profile ribs separated by the circumferential groove are supported on one another in the region of the sipe-like narrow portions, contributing to a reduction in the rolling resistance. When the tread has worn down further, the channel ensures good braking characteristics on a wet roadway.

A pneumatic tire of the type mentioned at the outset for a vehicle, which is preferably a utility vehicle tire, is known, for example, from DE 10 2017 208 010 A1. The tread of the tire has at least one circumferential groove, which, when viewed in cross section, is composed of a radially outer portion widening outward in the shape of a funnel, a middle portion running in the radial direction and having a width of 1.0 mm to 3.0 mm, and a radially inner channel region having a larger cross-sectional area than that in the middle portion. The channel region has two channel walls having radially inner wall portions, which run at an angle of 5° to 25° with respect to the radial direction, with the distance from one another decreasing, and run in a wave shape in the direction of their circumferential extent. After corresponding tread wear, the wave shape leads to the formation at the tread periphery of groove edges with a greater edge length than straight groove edges, as a result of which the grip and braking characteristics on a wet roadway are improved.

SUMMARY

In the case of pneumatic tires for vehicles of the type stated at the outset, the narrow, radially extending portion of the circumferential groove has the effect that the drainage behavior of the tread, particularly in the region of the profile ribs adjacent to the circumferential groove, is in need of improvement when the tire is new or exhibits little wear. This impairs the performance of the tire on a wet roadway, especially the grip and braking characteristics.

It is the underlying object of the invention, in the case of a pneumatic tire of the type stated at the outset for a vehicle, to further improve the drainage behavior of the tread, wherein the advantageous effect of the circumferential grooves on the rolling resistance of the tire is to be retained.

According to the invention, the stated object is achieved by virtue of the fact that the profile rib is provided over its circumference with sipes, which merge into the circumferential groove, run at an angle of 0° to 50° with respect to the axial direction and have a width of 0.4 mm to 1.2 mm and a maximum depth of 70% to 100% of the profile depth, and have sipe walls, wherein each sipe is locally widened by at least one channel which is open to the tread periphery and merges into the radially inner channel region of the circumferential groove, wherein the channel is formed by a depression formed in one sipe wall and a depression formed in the other sipe wall, opposite the first depression.

By virtue of the channels formed in the sipes, water drainage paths between the outer surface of the profile rib and the radially inner channel region of the circumferential groove are made available when the tire rolls on wet surfaces. When driving on a wet roadway, water that has been taken up is drained off in a particularly effective manner from the outer surface of the profile rib into the radially inner channel region of the circumferential groove via the channels in the sipes. The advantageous effect of the circumferential grooves in respect of the rolling resistance of the tire remains unaffected by this.

According to a preferred embodiment, each sipe has, at the tread periphery, a slot-shaped sipe widening which runs over its entire extent in plan view and has a bottom, a depth, determined in the radial direction, of 10% to 30%, in particular of 15% to 25%, of the depth of the sipe and a width of 250% to 370%, in particular of 290% to 330%, of the width of the sipe, wherein the channel starts from the bottom of the sipe widening. The slot-shaped sipe widening additionally promotes water take up from the outer surface of the profile rib, wherein the water is drained off via the channels as described. The slot-shaped sipe widening therefore contributes to a further improvement in drainage performance.

According to another preferred embodiment, the channel has a circular cross section with a diameter of 250% to 370%, in particular of 290% to 330%, of the width of the sipe. In such channels, the quantities of water which are taken up when driving on a wet roadway are drained off into the circumferential groove in a particularly efficient manner.

A combination of the two abovementioned embodiments in which the diameter of the channel coincides with the width of the sipe widening, is particularly preferred. This improves the interaction between the channel and the sipe widening in respect of the drainage effect.

A turbulence-free or substantially turbulence-free water flow through the channel is ensured if the channel is half U-shaped in a view toward the sipe wall.

According to another preferred embodiment, the width of the radially extending portion of the circumferential groove which delimits the profile rib on one side is 0.5 mm to 2.5 mm, particularly preferably from 0.8 mm to 1.2 mm.

The sipes with channels provided according to the invention are particularly advantageous if the associated profile rib is likewise delimited on the second side thereof by a circumferential groove. The profile rib is therefore a central or middle profile rib and hence is located completely within the ground contact area, as a result of which the sipes with the channels improve the drainage behavior of the tread particularly clearly.

In the preferred embodiment mentioned immediately above, it is advantageous if the circumferential groove which delimits the at least one profile rib on the second side thereof likewise has, when viewed in cross section, a portion running in the radial direction and having a width of up to 3.0 mm and, adjoining it, a radially inner channel region having two channel walls and a channel base forming the groove base, wherein the channel region has a larger cross-sectional area and is made wider in each case than the portion running in the radial direction, wherein the sipes formed in the profile rib are of symmetrical configuration in relation to a cross section center plane which is aligned in the radial direction and—with reference to the longitudinal extent—runs through the center of the sipe. This embodiment allows a particularly uniform improvement in drainage of the profile rib.

In combination with the abovementioned preferred embodiment, it is of further advantage for drainage if a connecting channel, which, in particular, runs at a constant depth, locally widens the sipe and is at a distance in the radial direction both from the tread periphery and from the sipe base, is formed between the channels. By means of this connecting channel, drainage of the profile rib is further improved, especially when cornering on a wet roadway.

In the case of the last-mentioned embodiments, it is advantageous if the width of the radially extending portion of the circumferential groove which delimits the at least one profile rib on the second side thereof is 0.5 mm to 2.5 mm, particularly preferably from 0.8 mm to 1.2 mm.

Another preferred embodiment is characterized in that the circumferential groove(s), which has or have the portion running in the radial direction and the radially inner channel region, is provided at the entries of the sipes with recesses having a diameter of 200% to 400%, in particular of 330% to 370%, of the width of the portion running in the radial direction, which recesses are circular in plan view, run in the radial direction, extend as far as the radially inner channel region, and are open to the tread periphery, wherein the recesses are each formed by indentations that lie opposite one another in pairs in the axial direction. The recesses improve the drainage of the respectively adjacent profile ribs. In the context of achieving the object, this means that the channels in the circumferential groove and the channels in the sipes merge into the radially inner channel region of the circumferential groove at substantially coinciding "circumferential positions" on the circumferential groove. This is advantageous especially for the water drainage behavior in the radially inner channel region of the circumferential groove.

According to another preferred embodiment, the channel walls of the radially inner channel region of the circumferential groove(s) are each composed of a radially inner wall portion and a radially outer wall portion, wherein the radially inner wall portions, when viewed in a cross section through the circumferential groove, each run at an angle of 5° to 15°, in particular of up to 10°, with respect to the radial direction, wherein these wall portions are inclined in opposite directions with respect to one another in such a way that the radially inner channel region widens continuously in the axial direction from the radially inner end of the radially inner wall portions to the radially outer end of the radially inner wall portions, wherein the channel or channels, which widens or widen the sipe, merges or merge via the radially inner wall portion into the radially inner channel region of the circumferential groove(s).

For the drainage of the tread, it is furthermore additionally advantageous if the circumferential groove(s), which has or have the portion running in the radial direction and the radially inner channel region, is or are composed of the portion running in the radial direction, the radially inner channel region, and a radially outer portion widening in a V shape toward the tread periphery.

According to another preferred embodiment, the channel has a main axis and a radially outer channel opening, wherein—with reference to the main axis—the radially outer channel opening is at a distance, projected into the tread periphery and determined in the axial direction, of 10% to 40%, in particular of 15% to 30%, particularly preferably of 20% to 25%, of the width of the profile rib, determined in the axial direction at the tread periphery, from the circumferential groove into which the channel merges.

It is furthermore advantageous for the stabilization of the channel if the sipes each have a sipe base and, for each channel, a base elevation adjacent to said channel and locally raising the sipe base in the radial direction.

BRIEF DESCRIPTION OF THE DRAWINGS

Further features, advantages and details of the invention will now be described in more detail on the basis of the drawing, which schematically shows exemplary embodiments of the invention. In the drawing.

DETAILED DESCRIPTION

Pneumatic tires for vehicles embodied according to the invention are tires for motor vehicles, in particular for multi-track motor vehicles, and preferably utility vehicle tires of a radial design, in particular for trucks (medium-weight trucks: 7.5 t<gross vehicle weight≤18.0 t, heavy trucks: gross vehicle weight>18.0 t).

Figure 1:
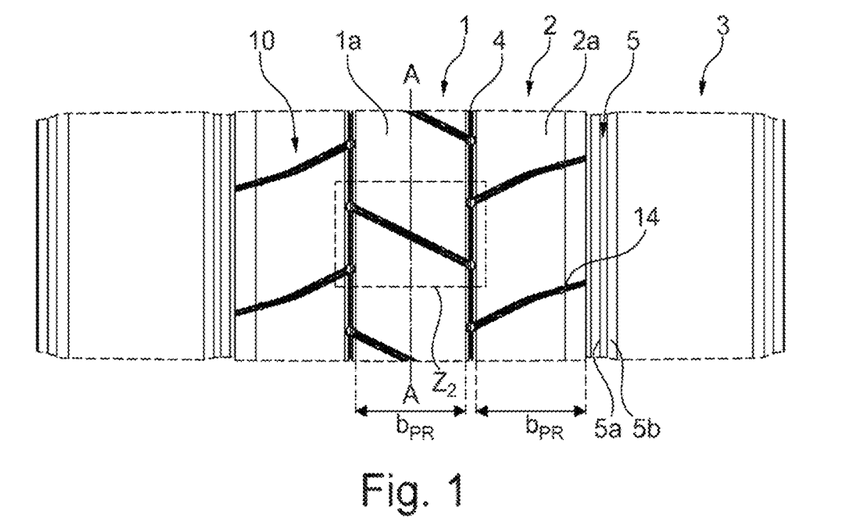
FIG. 1 shows a simplified plan view of a circumferential portion of a tread of a utility vehicle tire with a first embodiment variant of the invention.

FIG. 1 shows a plan view of a circumferential portion of a tread of a utility vehicle tire. The tire equatorial plane is indicated by a line A-A. The tread has a central profile rib 1, two middle profile ribs 2, and two shoulder-side profile ribs 3, wherein the central profile rib 1 is separated from the middle profile ribs 2 by middle circumferential grooves 4, and the middle profile ribs 2 are separated from the shoulder-side profile ribs 3 by shoulder-side circumferential grooves 5. The shoulder-side profile ribs 3 are illustrated only schematically and can be structured by means of grooves, sipes and the like.

Figure 4:
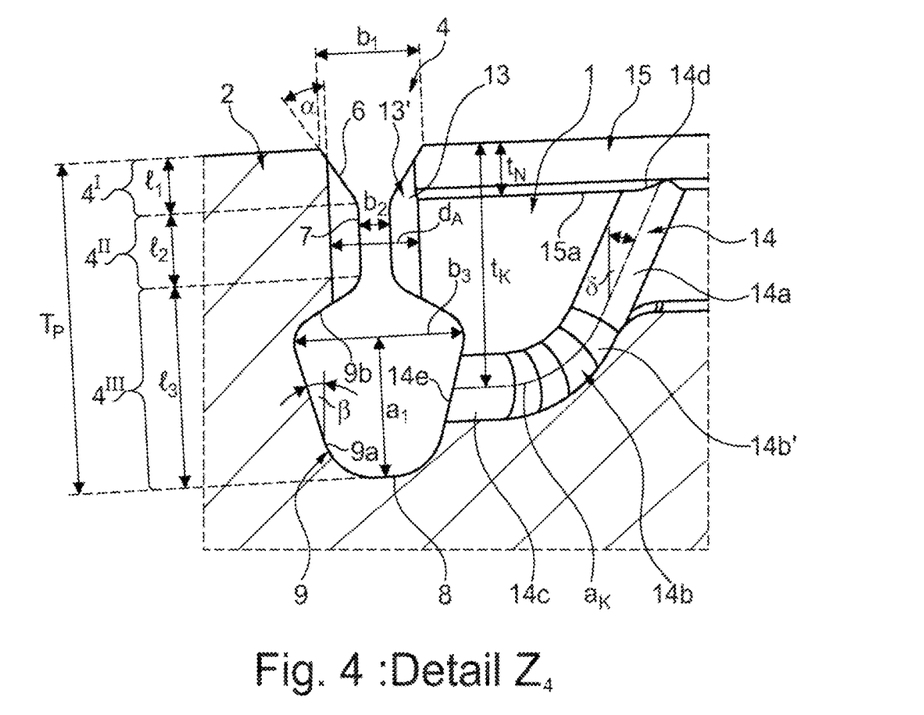
FIG. 4 shows a further enlarged view of detail $Z_4$ in FIG. 3.

In the exemplary embodiment shown, the circumferential grooves 4, 5 run in a straight line in plan view and are formed to the respectively envisaged profile depth $T_P$ (FIG. 4, shown for a middle circumferential groove 4) in the radial direction, which is generally 12.0 mm to 26.0 mm for the preferred type of tire (utility vehicle tire).

The shoulder-side circumferential grooves 5 have a U-shaped cross section (not visible) and are each delimited by a groove base 5a and two groove flanks 5b.

According to FIG. 4, the middle circumferential grooves 4 are each composed of a radially outer portion $4^I$, a middle portion $4^{II}$, and a radially inner channel region $4^{III}$ when viewed in cross section and in the radial direction, wherein, in the exemplary embodiment shown, portions $4^I$, $4^{II}$ are provided with paired local indentations 13 (cf. FIG. 2) running in the radial direction. The configuration of the indentation 13 will be explored in greater detail below.

The radially outer portion $4^I$ widens in a V shape to the tread periphery, is delimited by two flanks 6 which, when viewed in cross section, run at an angle α of 30° to 50° with respect to the radial direction, and has a width $b_1$ of 2.5 mm to 6.0 mm in the axial direction and a length of extent $I_1$ of 10% to 30% of the profile depth $T_P$ in the radial direction at the tread periphery. The middle portion $4^{II}$ is delimited by two flanks 7 running in the radial direction, and has a width $b_2$ of up to 3.0 mm, in particular of 0.5 mm to 2.5 mm, particularly preferably of 0.8 mm to 1.2 mm, in the axial direction, and a length of extent $I_2$ of 30% to 60% of the profile depth $T_P$ in the radial direction. The radially inner channel region $4^{III}$ has a larger cross-sectional area in the axial direction than the middle portion $4^{II}$, is made wider in the axial direction than the latter, and has a length of extent 13 of 30% to 60% of the profile depth $T_P$ in the radial direction, and is delimited by a channel base 8 running at the profile depth $T_P$ and simultaneously forming the groove base of the circumferential groove 4, and by lateral channel walls 9 arching into the central profile rib 1 and the adjacent middle profile rib 2. The channel walls 9 are each composed of a radially inner wall portion 9a and a radially outer wall portion 9b. When viewed in a cross section through the circumferential groove 4, the radially inner wall portions 9a each run at an angle β of 5° to 15°, in particular of up to 10°, with respect to the radial direction, wherein they are inclined in opposite directions with respect to one another in such a way that the channel region $4^{III}$ widens continuously in the axial direction from the radially inner end of the wall portions 9a to the radially outer end of the wall portions 9a. The channel region $4^{II}$ has its widest location in the axial direction between the transitions of the radially inner wall portions 9a to the radially outer wall portions 9b, wherein this location is at a distance $a_1$ from the lowest point of the circumferential groove 4 of 70% to 85%, determined in the radial direction, of the already mentioned length of extent $I_3$ belonging to channel region $4^{III}$. At the widest location, the channel region $4^{III}$ has a width $b_3$ of 5.0 mm to 7.0 mm.

According to FIG. 1, the central profile rib 1 and each middle profile rib 2 have a width $b_{PR}$, determined in the axial direction at the tread periphery, and are provided with a multiplicity of sipes 10, which are distributed over the circumference of the profile rib 1, 2, run parallel to one another within the respective profile rib 1, 2 in plan view, transect the profile rib 1, 2 and impart rib blocks 1a and 2a to the latter. According to FIG. 2, each sipe 10 is of symmetrical design in relation to a longitudinal-section center plane $E_1$, which is oriented in the radial direction and runs longitudinally through the center of the sipe 10. Furthermore, each sipe 10 is of symmetrical configuration in relation to a cross-section center plane $E_2$ (cf. FIG. 3), which is oriented in the radial direction and which runs orthogonally to the longitudinal-section center plane $E_1$ and, in relation to the longitudinal extent, runs through the center of the sipe 10. When viewed in plan view and in relation to the longitudinal-section center plane $E_1$, the sipes 10 run at an angle γ of 0° to 50°, in particular of 5° to 40°, preferably of 20° to 35°, with respect to the axial direction, wherein the sipes 10 in the middle profile ribs 2 are inclined in the opposite direction to the sipes 10 in the central profile rib 1 in relation to the axial direction (FIG. 1).

The further configuration of the sipes 10 is explained below with reference to an individual sipe 10 formed in the middle profile rib 1.

Figure 2:
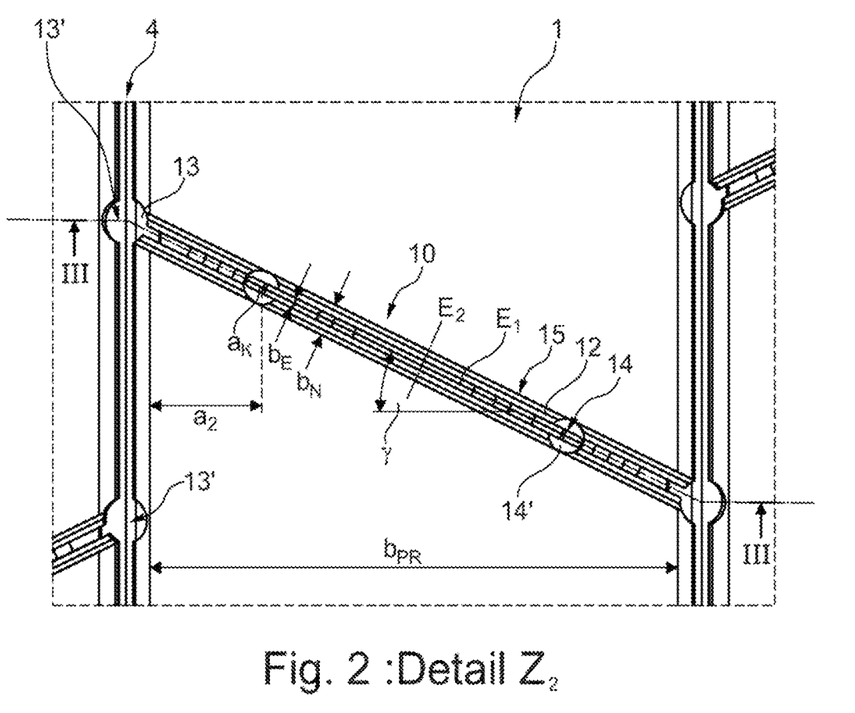
FIG. 2 shows an enlarged plan view of the detail $Z_2$ in FIG. 1.
Figure 3:
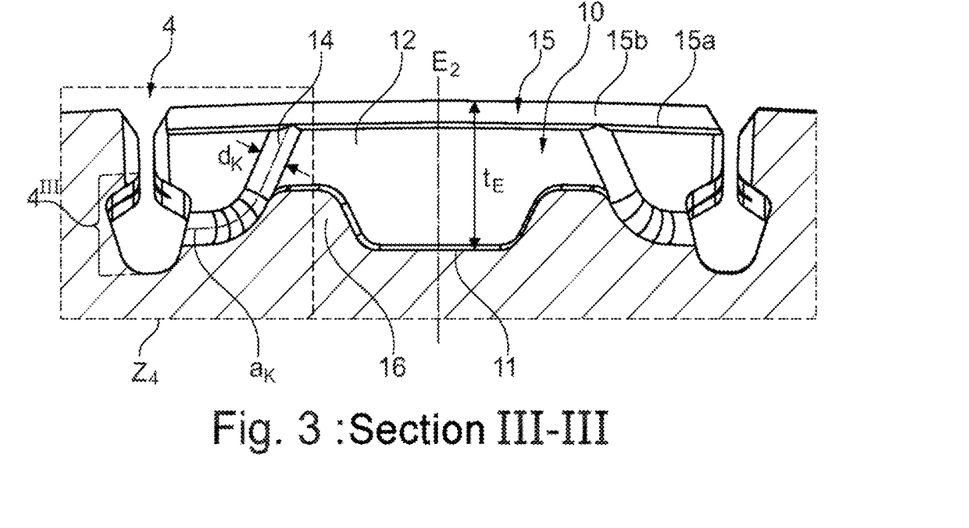
FIG. 3 shows a section along the line III-III of FIG. 2.

As FIG. 2 and FIG. 3 show in combination, the sipe 10 has a sipe base 11 (FIG. 3) and two mutually opposite sipe walls 12 (FIG. 2) running in the radial direction, is extended by two tubular channels 14 running to the middle circumferential grooves 4, and furthermore has a slot-shaped sipe widening 15 at the tread periphery. Between the sipe walls 12—that is to say in the region outside the channels 14 and the sipe widening 15—the sipe has a width be (FIG. 2) of 0.4 mm to 1.2 mm, in particular of up to 0.8 mm, determined perpendicularly to the longitudinal-section center plane $E_1$, and a depth $t_E$ (FIG. 3) at its deepest point in the radial direction of 70% to 10% of the profile depth $T_P$ (FIG. 3). The depth $t_E$ is preferably no more than the profile depth $T_P$ reduced by 1.0 mm. Outside the channels 14 and the slot-shaped sipe widening 15, the sipe walls 12 are unstructured, flat surfaces.

According to FIG. 2, the sipe widening 15 runs in a straight line and over the entire sipe 10 when viewed in plan view, and—in accordance with the stated symmetrical configuration of the sipe 10—is of symmetrical design in relation to the longitudinal-section center plane $E_1$, and is bisected in its longitudinal extent by the cross-section center plane $E_2$. When viewed in cross section, the sipe widening 15 is of rectangular or U-shaped design, is furthermore delimited by two side surfaces 15b (FIG. 3), running in particular in the radial direction, and delimited in the radial direction by a bottom 15a (FIG. 3), and, in the longitudinal-section center plane $E_1$, has a depth $t_N$ (FIG. 4) in the radial direction of 10% to 30%, in particular of 15% to 25%, of the depth $t_E$ (FIG. 3) of the sipe 10 and a width $b_N$, determined perpendicularly to the longitudinal-section center plane $E_1$, of 250% to 370%, in particular of 290% to 330%, of the width be of the sipe 10.

The two channels 14 are each of symmetrical design in relation to the longitudinal-section center plane $E_1$, wherein one channel 14 is formed symmetrically with respect to the other channel 14 in relation to the cross-section center plane $E_2$ (FIG. 3), with the result that one channel 14 is situated in the half of the sipe 10 defined by the cross-section center plane $E_2$, and the other channel 14 is situated in the other half of the sipe 10, defined by the cross-section center plane $E_2$ (FIG. 3). According to FIG. 3, each channel 14 starts from the bottom 15a of the sipe widening 15, merges into the radially inner channel region $4^{III}$ of the corresponding middle circumferential groove 4, is formed by a depression 14' (FIG. 2) formed in one sipe wall 12 and by a depression 14' (FIG. 2) formed in the other sipe wall 12, runs in a half U shape and has a circular cross section, a main axis $a_K$ running through its center and a diameter $d_K$ of 250% to 370%, in particular of 290% to 330%, of the width $b_E$ (FIG. 2) of the sipe 10. The diameter $d_K$ of the channel 14 preferably coincides with the width $b_N$ (FIG. 2) of the sipe widening 15.

According to FIG. 4, each channel 14 in the exemplary embodiment shown is composed of a radially outer channel portion 14a starting from the bottom 15a of the sipe widening 15, a middle channel portion 14b, and a channel end portion 14c, wherein the radially outer channel portion 14a has a channel opening 14d situated at the groove base 15a, and the channel end portion 14c has a channel opening 14e situated in the radially inner wall portion 9a of the corresponding channel wall 9 of the radially inner channel region $4^{III}$. In relation to the main axis $a_K$, the channel opening 14d is at a distance $a_2$ (FIG. 2), determined in the axial direction and projected into the tread periphery, of 10% to 40%, in particular of 15% to 30%, particularly preferably of 20% to 25%, of the width $b_{PR}$ (FIG. 2) of the middle profile rib 1, from the middle circumferential groove 4, into which the channel 14 merges.

In relation to the main axis $a_K$, the channel portion 14a runs in a straight line and at an angle δ of 15° to 40°, in particular of 20° to 30°, with respect to the radial direction. In relation to the main axis $a_K$, the middle channel portion 14b runs in an arc shape overall and is composed of four channel subsections 14b', which, in relation to the main axis $a_K$, run along circular arcs of various radii. In relation to the main axis $a_K$, the channel end portion 14c runs in a straight line and at a depth $t_K$, determined in the radial direction, of 50% to 100%, in particular of at least 60%, of the depth $t_E$ (FIG. 3) of the sipe 10, wherein the depth $t_K$ is appropriately matched to the already mentioned length of extent $l_3$ of the radially inner channel region $4^{III}$.

In the exemplary embodiment shown, as per FIG. 3, the sipe base 11 ends at the channels 14, wherein furthermore a base elevation 16, which raises a portion of the sipe base 11 in the radial direction relative to the depth $t_E$ and extends as far as the sipe walls 12, is formed adjoining each channel 14.

In the case of the sipes 10 formed in the middle profile rib 2, as shown in FIG. 1, the channel 14, which in each case continues on on the outside of the tread, merges via the respective groove flank 5b into the corresponding shoulder-side circumferential groove 5.

As FIG. 2 and FIG. 4 show, especially in combination, the already mentioned paired indentations 13 are located at the mouths of the sipes 10, said mouths being situated at the middle circumferential groove 4. The indentations 13, which each belong to a pair, form a recess 13' (FIG. 2), which is circular in plan view, extends as far as the channel region $4^{III}$ (FIG. 4) and has a diameter $d_A$ (FIG. 4) of 200% to 400%, in particular of 330% to 370%, of the width $b_2$ (FIG. 4) of the middle portion $4^{II}$ of the circumferential groove 4.

Figure 5:
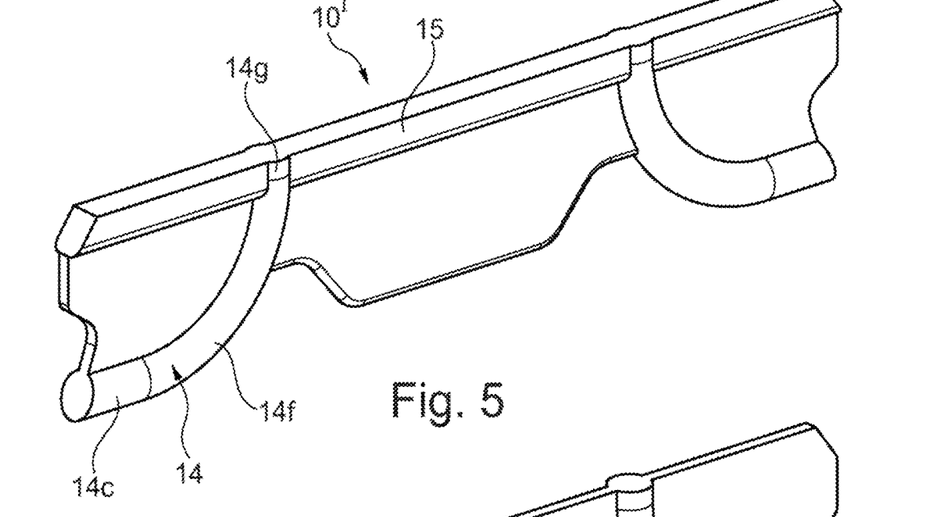
FIG. 5 shows a visualization of a sipe according to a second embodiment variant.
Figure 6:
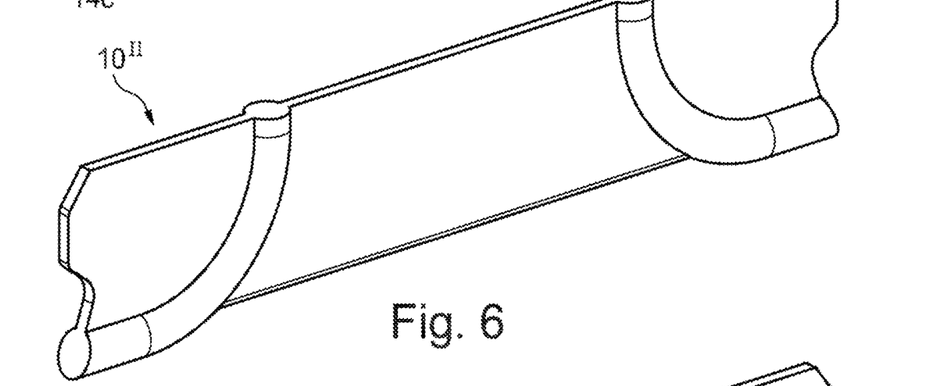
FIG. 6 shows a visualization of a sipe according to a third embodiment variant.
Figure 7:
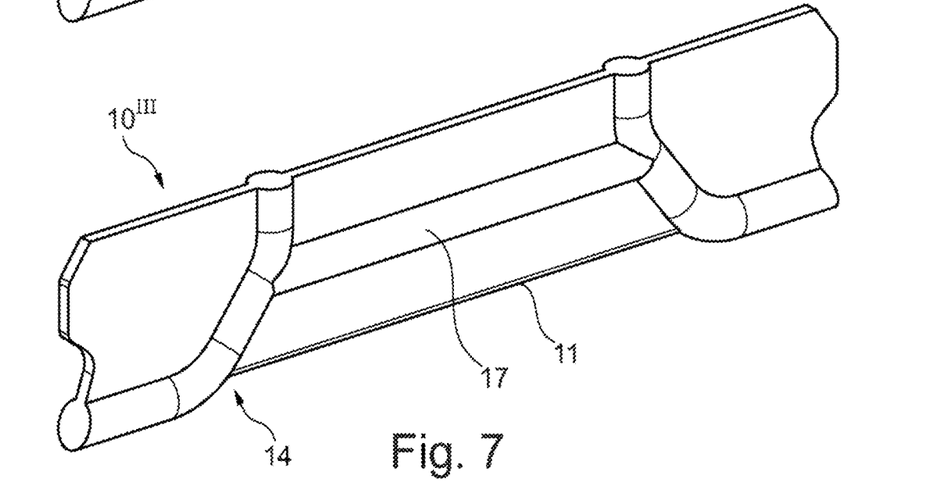
FIG. 7 shows a visualization of a sipe according to a fourth embodiment variant.

FIG. 5 to FIG. 7 show visualizations of sipes $10^I$ (FIG. 5), $10^{II}$ (FIG. 6), $10^{III}$ (FIG. 7), which are variants of the sipe 10.

The sipe $10^I$ shown in FIG. 5 differs from the sipe 10 in that each channel 14 is composed of a middle channel portion 14f, which is curved continuously and uniformly and takes up the majority of the channel 14, a channel end portion 14c, and a radially outer channel portion 14g, which extends as far as the tread periphery, is formed exclusively in the region of the sipe widening 15 and runs in the radial direction.

The sipe $10^{II}$ shown in FIG. 6 differs from the sipe $10^I$ in that no base elevations 16 (FIG. 3) and no sipe widening 15 (FIG. 3) are provided.

In the case of the sipe $10^{III}$ shown in FIG. 7, each channel 14 is composed of five channel portions—three straight and two curved channel portions—wherein each straight channel portion alternately follows a curved channel portion. Moreover, a connecting channel 17, which locally widens the sipe $10^{III}$, is formed between the two channels 14, said connecting channel running at a constant depth, determined in the radial direction, and being at a distance in the radial direction both from the tread periphery and from the sipe base 11.

The invention is not limited to the exemplary embodiments described.

The profile rib can be provided with transverse grooves made wider than the sipes. The sipes can also be formed in shoulder-side profile ribs and can furthermore each be provided with just a single channel. Moreover, the sipes do not have to run parallel to one another in plan view. The channel or channels can merge into the respective circumferential groove at a distance from the sipe base which is determined in the radial direction. The radially outer circumferential-groove portion $4^I$, which widens in a V shape to the tread periphery, is optional.

LIST OF REFERENCE SIGNS

1 . . . Central profile rib
1a . . . Rib block
2 . . . Middle profile rib
2a . . . Rib block
3 . . . Shoulder-side profile rib
4 . . . Middle circumferential groove
$4^I$ . . . Radially outer portion
$4^{II}$ . . . Middle portion
$4^{III}$ . . . Radially inner channel region
5 . . . Shoulder-side circumferential groove
5a . . . Groove base
5b . . . Groove flank
6 . . . Flank
7 . . . Flank
8 . . . Channel base
9 . . . Channel wall
9a . . . Radially inner wall portion
9b . . . Radially outer wall portion
10, $10^I$, $10^{II}$, $10^{III}$ . . . Sipe
11 . . . Sipe base
12 . . . Sipe wall
13 . . . Indentation
13' . . . Recess
14 . . . Channel
14a . . . Radially outer channel portion
14b . . . Middle channel portion
14b . . . Channel subsection
14c . . . Channel end portion
14d . . . Channel opening
14e . . . Channel opening
14f . . . Middle channel portion
14g . . . Radially outer channel portion
14' . . . Depression
15 . . . Sipe widening
15a . . . Bottom
15b Side surface
16 . . . Base elevation
17 . . . Connecting channel
A-A . . . . Line (tire equatorial plane)
$a_1$, $a_2$ . . . Distance
$a_K$ . . . Main axis
$b_1$, $b_2$, $b_3$ . . . Width
$b_E$, $b_N$ . . . Width
$b_{PR}$ . . . Width
$d_A$, $d_K$ . . . Diameter
$E_1$ . . . Longitudinal-section center plane
$E_2$ . . . Cross-section center plane
$l_1$, $l_2$, $l_3$ . . . Length of extent
$t_E$, $t_N$, $t_K$ . . . Depth
$T_P$ . . . Profile depth
$Z_2$, $Z_A$ . . . Detail
α, β, γ, δ . . . Angle

The invention claimed is:

1. A pneumatic tire for a vehicle, comprising a tread having at least one profile rib, which is delimited on at least one side by a circumferential groove, wherein the circumferential groove has, when viewed in cross section, a portion running in the radial direction and having a width of up to 3.0 mm and, adjoining it, a radially inner channel region, wherein the radially inner channel region is delimited by two channel walls and a channel base forming the groove base, and has a larger cross-sectional area and is made wider in each case than the portion running in the radial direction, wherein the profile rib is provided over its circumference with sipes, which merge into the circumferential groove, run at an angle of 0° to 50° with respect to the axial direction and have a width of 0.4 mm to 1.2 mm and a maximum depth of 70% to 100% of the profile depth, and have sipe walls, wherein each sipe is locally widened by at least one channel which is open to the tread periphery and merges into the radially inner channel region of the circumferential groove, wherein the channel is formed by a depression formed in one sipe wall and a depression formed in the other sipe wall, opposite the first depression, and each sipe has, at the tread periphery, a slot-shaped sipe widening which runs over its entire extent in plan view and has a bottom, a depth, determined in the radial direction, of 10% to 30%, of the depth of the sipe and a width of 250% to 370%, of the width of the sipe, wherein the channel starts from the bottom of the sipe widening.

2. The pneumatic tire as claimed in claim 1, wherein the channel has a circular cross section with a diameter of 250% to 370%, of the width of the sipe.

3. The pneumatic tire as claimed in claim 1, wherein the diameter of the channel coincides with the width of the sipe widening.

4. The pneumatic tire as claimed in claim 1, wherein the channel is half U-shaped in a view toward the sipe wall.

5. The pneumatic tire as claimed in claim 1, wherein the width of the radially extending portion of the circumferential groove which delimits the profile rib on one side thereof is 0.5 mm to 2.5 mm.

6. The pneumatic tire as claimed in claim 1, wherein the circumferential groove(s), which has or have the portion running in the radial direction and the radially inner channel region, is or are provided at the entries of the sipes with recesses having a diameter of 200% to 400%, of the width of the portion running in the radial direction, which recesses are circular in plan view, run in the radial direction, extend as far as the radially inner channel region, and are open to the tread periphery, wherein the recesses are each formed by indentations that lie opposite one another in pairs in the axial direction.

7. The pneumatic tire as claimed in claim 1, wherein the channel walls of the radially inner channel region of the circumferential groove(s) are each composed of a radially inner wall portion and a radially outer wall portion, wherein the radially inner wall portions, when viewed in a cross section through the circumferential groove, each run at an angle of 5° to 15°, with respect to the radial direction, wherein they are inclined in opposite directions with respect to one another in such a way that the radially inner channel region widens continuously in the axial direction from the radially inner end of the radially inner wall portions to the radially outer end of the radially inner wall portions, wherein the channel or channels, which widens or widen the sipe, merges or merge via the radially inner wall portion into the radially inner channel region of the circumferential groove(s).

8. The pneumatic tire as claimed in claim 1, wherein the circumferential groove(s), which has or have the portion running in the radial direction and the radially inner channel region, is or are composed of the portion running in the radial direction, the radially inner channel region, and a radially outer portion widening in a V shape toward the tread periphery.

9. The pneumatic tire as claimed in claim 1, wherein the channel has a main axis and a radially outer channel opening, wherein—with reference to the main axis—the radially outer channel opening is at a distance, projected into the tread periphery and determined in the axial direction, of 10% to 40%, of the width of the profile rib, determined in the axial direction at the tread periphery, from the circumferential groove into which the channel merges.

10. The pneumatic tire as claimed in claim 1, wherein the slot-shaped sipe widening has its depth, determined in the radial direction, of 15% to 25%, of the depth of the sipe and its width of 290% to 330%, of the width of the sipe.

11. The pneumatic tire as claimed in claim 1, wherein the channel has a circular cross section with a diameter of 290% to 330%, of the width of the sipe.

12. The pneumatic tire as claimed in claim 1, wherein the width of the radially extending portion of the circumferential groove which delimits the profile rib on one side thereof is 0.8 mm to 1.2 mm.

13. The pneumatic tire as claimed in claim 1, wherein the circumferential groove(s), which has or have the portion running in the radial direction and the radially inner channel region, is or are provided at the entries of the sipes with recesses having a diameter of 330% to 370%, of the width of the portion running in the radial direction, which recesses are circular in plan view, run in the radial direction, extend as far as the radially inner channel region, and are open to the tread periphery, wherein the recesses are each formed by indentations that lie opposite one another in pairs in the axial direction.

14. The pneumatic tire as claimed in claim 1, wherein the channel walls of the radially inner channel region of the circumferential groove(s) are each composed of a radially inner wall portion and a radially outer wall portion, wherein the radially inner wall portions, when viewed in a cross section through the circumferential groove, each run at an angle of 5° to 10°, with respect to the radial direction, wherein they are inclined in opposite directions with respect to one another in such a way that the radially inner channel region widens continuously in the axial direction from the radially inner end of the radially inner wall portions to the radially outer end of the radially inner wall portions, wherein the channel or channels, which widens or widen the sipe, merges or merge via the radially inner wall portion into the radially inner channel region of the circumferential groove(s).

15. The pneumatic tire as claimed in claim 1, wherein the at least one profile rib is likewise delimited on the second side thereof by a circumferential groove.

16. The pneumatic tire as claimed in claim 15, wherein the circumferential groove which delimits the at least one profile rib on the second side thereof likewise has, when viewed in cross section, a portion running in the radial direction and having a width of up to 3.0 mm and, adjoining it, a radially inner channel region having two channel walls and a channel base forming the groove base, wherein the channel region has a larger cross-sectional area and is made wider—in each case than the portion running in the radial direction—wherein the sipes formed in the profile rib are of symmetrical configuration in relation to a cross-section center plane which is aligned in the radial direction and—with reference to the longitudinal extent—runs through the center of the sipe.

17. The pneumatic tire as claimed in claim 16, wherein a connecting channel, which, locally widens the sipe and is at a distance in the radial direction both from the tread periphery and from the sipe base, is formed between the channels.

18. The pneumatic tire as claimed in claim 16, wherein the width of the radially extending portion of the circumferential groove which delimits the at least one profile rib on the second side thereof is 0.5 mm to 2.5 mm.

19. The pneumatic tire as claimed in claim 16, wherein the width of the radially extending portion of the circumferential groove which delimits the at least one profile rib on the second side thereof is from 0.8 mm to 1.2 mm.

* * * * *